(12) United States Patent
Gonzalez et al.

(10) Patent No.: US 12,180,427 B2
(45) Date of Patent: Dec. 31, 2024

(54) COMPOSITION AND METHOD FOR IMPROVED DESALTER BRINE QUALITY

(71) Applicant: BL TECHNOLOGIES, INC., Minnetonka, MN (US)

(72) Inventors: Javier Gonzalez, Minnetonka, MN (US); Michael Dion, Minnetonka, MN (US); Peter L. Perez-Diaz, Minnetonka, MN (US)

(*) Notice: Subject to any disclaimer, the term of this patent is extended or adjusted under 35 U.S.C. 154(b) by 116 days.

(21) Appl. No.: 17/633,337

(22) PCT Filed: Jul. 8, 2020

(86) PCT No.: PCT/US2020/041101
§ 371 (c)(1),
(2) Date: Feb. 7, 2022

(87) PCT Pub. No.: WO2021/029988
PCT Pub. Date: Feb. 18, 2021

(65) Prior Publication Data
US 2022/0282167 A1    Sep. 8, 2022

Related U.S. Application Data

(60) Provisional application No. 62/887,036, filed on Aug. 15, 2019.

(51) Int. Cl.
| | | |
|---|---|---|
| *C10G 31/00* | (2006.01) |
| *C02F 1/26* | (2023.01) |
| *C02F 1/68* | (2023.01) |
| *C10G 31/08* | (2006.01) |
| *C10G 33/04* | (2006.01) |
| *C02F 103/36* | (2006.01) |

(52) U.S. Cl.
CPC ............... *C10G 31/08* (2013.01); *C02F 1/26* (2013.01); *C02F 1/682* (2013.01); *C10G 33/04* (2013.01); *C02F 2103/365* (2013.01)

(58) Field of Classification Search
CPC ...... C02F 1/26; C02F 1/682; C02F 2103/365; B01D 17/04; C10G 33/04; C10G 31/08
See application file for complete search history.

(56) References Cited

U.S. PATENT DOCUMENTS

| | | |
|---|---|---|
| 3,684,699 A | 8/1972 | Vermeulen |
| 4,722,781 A | 2/1988 | Swartz et al. |
| 5,614,101 A | 3/1997 | DeWalls et al. |
| 5,882,506 A * | 3/1999 | Ohsol ............ C10G 33/04 208/186 |
| 8,562,816 B1 | 10/2013 | Paille, Jr. |
| 2002/0177538 A1 | 11/2002 | Hart et al. |
| 2014/0317998 A1 | 10/2014 | Metcalfe et al. |
| 2015/0361350 A1 | 12/2015 | Prasad et al. |

OTHER PUBLICATIONS

International Search Report and Written Opinion for International Application No. PCT/US2020/041101, mailed Oct. 19, 2020, 13 pages.

* cited by examiner

*Primary Examiner* — Prem C Singh
*Assistant Examiner* — Brandi M Doyle
(74) *Attorney, Agent, or Firm* — McCarter & English, LLP

(57) ABSTRACT

A method of improving effluent brine quality, the method (i) providing a mud wash solvent comprising a hydrocarbon having a specific gravity less than that of a desalter brine to be treated; and (ii) adding the mud wash solvent to a mud wash stream of a desalter system to provide a treated effluent brine.

8 Claims, 2 Drawing Sheets

COMPOSITION AND METHOD FOR IMPROVED DESALTER BRINE QUALITY

CROSS-REFERENCE TO RELATED APPLICATION

This application is a national phase of International Patent Application No. PCT/US2020/041101 filed Jul. 8, 2020, which claims the priority benefit of U.S. Provisional Patent Application Ser. No. 62/887,036 filed Aug. 15, 2019, the entireties of which is are incorporated by reference.

FIELD OF INVENTION

The disclosed technology generally provides for a mud wash solvent, and more specifically, a mud wash solvent and method for improving desalter effluent brine quality.

BACKGROUND OF THE INVENTION

Refinery desalter systems are designed to remove primarily inorganic salts from a crude oil that can cause corrosion and fouling in downstream units prior to refining. The desalting step is provided by adding and mixing with the crude a few volume percentages of fresh water to contact the brine and salts present in the crude. The salts are extracted by shearing the crude with water, and resolving the resultant oil-water emulsions with the assistance of electrical, thermal, and/or chemical energy. The resulting oil-water emulsion is required to be separated for further processing of the crude oil.

Over time, separated solids within the crude (such as, but not limited to, sand, silt, clay, carbonates, corrosion by-products, bitumen, and/or aggregated asphaltenes) that are separated from the crude accumulate in the bottom of the desalter vessel. Thus, the desalter must be periodically washed to remove this accumulation. The solids, typically in the form of heavy a complex emulsion of water, solids, asphaltenes, bitumen, and/or other hydrocarbons are removed by "mud washing": circulating a portion of the brine or wash water through spray nozzles in the bottom of the mud wash vessel to create turbulence in order to remove the solids in the desalter effluent brine. These solids are then routed to the wastewater system.

Many desalter systems are equipped with mud wash piping designed to periodically agitate the water on the bottom of the desalter and remove the accumulation of oily solids. Water is pumped into the mud wash header, exiting the nozzle as a turbulent jet directed at the bottom of the vessel. Due to turbulence created in the desalter during mud washing, it is common to entrain some oil and emulsion from the interphase into the desalter brine. This is especially true when solids have accumulated in the bottom of the desalter reducing available water volume and creating uneven water distribution. In addition, the mud itself can contain significant oil attached to solids, which makes disposal of the mud more costly and time consuming.

With the advent of new opportunity crudes and crude blends, desalters are challenged to not only extract inorganic salts, but a plethora of other components such as amines, metals from metal naphthenates, and fine solid particles while increasing the crude blend processing flexibility to include heavy bitumen containing crudes or incompatible crude blends. This increased crude blend operating envelope may stress the quality of the desalter effluent brine, thus increasing the risk of complying with wastewater discharge specifications and volatile components regulations.

Thus, what is needed in the art is a composition and method for improving mud wash effluent brine quality for refinery desalter systems.

SUMMARY OF THE INVENTION

The disclosed technology generally provides for a mud wash solvent, and more specifically, a mud wash solvent and method for improving desalter effluent brine quality.

In one aspect of the disclosed technology, a method of improving effluent brine quality is provided. The method comprises (i) providing a mud wash solvent comprising a hydrocarbon having a specific gravity less than that of a desalter brine to be treated; and (ii) adding the mud wash solvent to a mud wash stream of a desalter system to provide a treated effluent brine.

In some embodiments, the specific gravity of the hydrocarbon is less than about 1. In some embodiments, the specific gravity of the hydrocarbon is less than about 0.7. In some embodiments, the hydrocarbon comprises (i) kerosene, (ii) naphtha, (iii) diesel, (iv) aromatic naphtha, and/or (v) heavy aromatic naphtha.

In some embodiments, the mud wash solvent is added to the mud wash stream at about 0.1-100% solvent per gallons per minute of mud wash stream. In some embodiments, the mud wash solvent is added to the mud wash stream at about 0.1-10% solvent per gallons per minute of mud wash stream. In some embodiments, the mud wash solvent is added to the mud wash stream at about 0.5-5% solvent per gallons per minute of mud wash stream.

In some embodiments, the mud wash stream comprises an oil and grease content of up to 10,000 ppm. In some embodiments, the mud wash stream comprises an oil and grease content of 10,000 ppm or higher. In some embodiments, the mud wash stream comprises an oil and grease content of about 1,000-10,000 ppm.

In some embodiments, the mud wash solvent is directly injected into the mud wash stream. In some embodiments, the mud wash solvent is injected into the mud wash stream at approximately 0.1-10% solvent per gallons per minute of mud wash recirculation flow.

In some embodiments, the desalter system comprises (i) a single stage desalter process, (ii) a two-stage desalter process, or (iii) more than a two-stage desalter process. In some embodiments, the desalter system comprises a mud wash pump. In some embodiments, the mud wash solvent is added to the mud wash stream prior to the mud wash pump.

In some embodiments, the treated effluent brine comprises an oil and grease content of less than about 1000 ppm. In some embodiments, the treated effluent brine comprises an oil and grease content of less than about 500 ppm. In some embodiments, the treated effluent brine comprises an oil and grease content of less than about 125 ppm. In some embodiments, the mud wash solvent further comprises an emulsion breaker composition. In some embodiments, the emulsion breaker composition comprises polyacrylamides, polyols, resin esters, sulfonates, succinates, tannins, polyamines, alkyl phenol resin ethoxylates, non-alkoxylated phenolic resin, hydroxy acids, polyisoalkyl succinimide derivatives, succinate derivatives, or a combination thereof. In some embodiments, less than about 50 ppm of the emulsion breaker composition is added to the mud wash solvent.

In some embodiments, the emulsion breaker composition comprises a non-alkoxylated phenolic resin, a polyisoalkyl succinimide derivative, and/or a succinate derivative. In some embodiments, greater than about 50 ppm of the emulsion breaker composition is added to the mud wash solvent.

In yet another aspect of the disclosed technology, a method of improving effluent brine quality is provided. The method comprises (i) providing a mud wash solvent, the mud wash solvent comprising a hydrocarbon having a specific gravity of less than about 1; and (ii) adding the mud wash solvent to a mud wash stream of a desalter system, wherein the mud wash stream comprises a desalter brine having an oil and grease content of at least 1,000 ppm, to provide a treated effluent brine having an oil and grease content of less than about 500 ppm.

In some embodiments, the mud wash stream comprises an oil and grease content of up to 10,000 ppm. In some embodiments, the mud wash stream comprises an oil and grease content of 10,000 ppm or higher. In some embodiments, the mud wash stream comprises an oil and grease content of about 1,000-10,000 ppm.

In yet another aspect of the disclosed technology, a mud wash solvent composition is provided. The composition comprises a hydrocarbon compound having a specific gravity of less than about 1.0. In some embodiments, the specific gravity of the hydrocarbon is less than about 0.8. In some embodiments, the specific gravity of the hydrocarbon is less than about 0.7.

In some embodiments, the hydrocarbon compound comprises (i) kerosene, (ii) naphtha, (iii) diesel, (iv) aromatic naphtha, (v) heavy aromatic naphtha, and/or (vi) a combination thereof. In some embodiments, the hydrocarbon compound is a kerosene distillate. In some embodiments, the solvent composition further comprises other distillates or naphthas. In some embodiments, the solvent composition further comprises an emulsion breaker composition. In some embodiments, the emulsion breaker composition comprises polyacrylamides, polyols, resin esters, sulfonates, succinates, tannins, polyamines, alkyl phenol resin ethoxylates, non-alkoxylated phenolic resin, hydroxy acids, polyisoalkyl succinimide derivatives, succinate derivatives, or a combination thereof. In some embodiments, less than about 50 ppm of the emulsion breaker composition is added to the mud wash solvent.

In some embodiments, the emulsion breaker composition comprises a non-alkoxylated phenolic resin, a polyisoalkyl succinimide derivative, and/or a succinate derivative. In some embodiments, greater than about 50 ppm of the emulsion breaker composition is added to the mud wash solvent.

BRIEF DESCRIPTION OF SEVERAL VIEWS OF THE DRAWINGS

These and other features of the disclosed technology, and the advantages, are illustrated specifically in embodiments now to be described, by way of example, with reference to the accompanying diagrammatic drawings, in which.

DETAILED DESCRIPTION OF EXEMPLARY EMBODIMENTS

The disclosed technology generally provides for a mud wash solvent, and more specifically, a mud wash solvent composition and method for improving desalter effluent brine quality. With the present technology, the use of the disclosed mud wash solvent composition and method in a desalter application aids in reducing the concentration of oil and grease (O&G) in desalter effluent brines (i.e. produces low oil and grease desalter effluent brines), thereby improving mud wash effluent brine quality for refinery desalter systems. Further, the present technology can assist with the resolution and extraction of solids laden emulsions.

The disclosed technology provides for a method of improving effluent brine quality. The method comprises (i) providing a mud wash solvent, and (ii) adding the mud wash solvent to a mud wash stream of a desalter system to provide a treated effluent brine. By treating the effluent brine, harmful contaminants and other debris are removed, the removal of which is critical to avoid costly corrosion and fouling of downstream equipment. Further, by removing complex emulsions and organics in the desalter effluent brine, the risk of downstream regulatory non-compliance in a wastewater treatment plant, including discharge specifications and volatile emissions, is reduced. It also minimizes (i) costs to separate emulsions in the wastewater treatment plant, (ii) energy to reheat recovered oil, and (iii) the opportunity cost with replacing crude with recovered oil for reprocessing.

Figure 1:
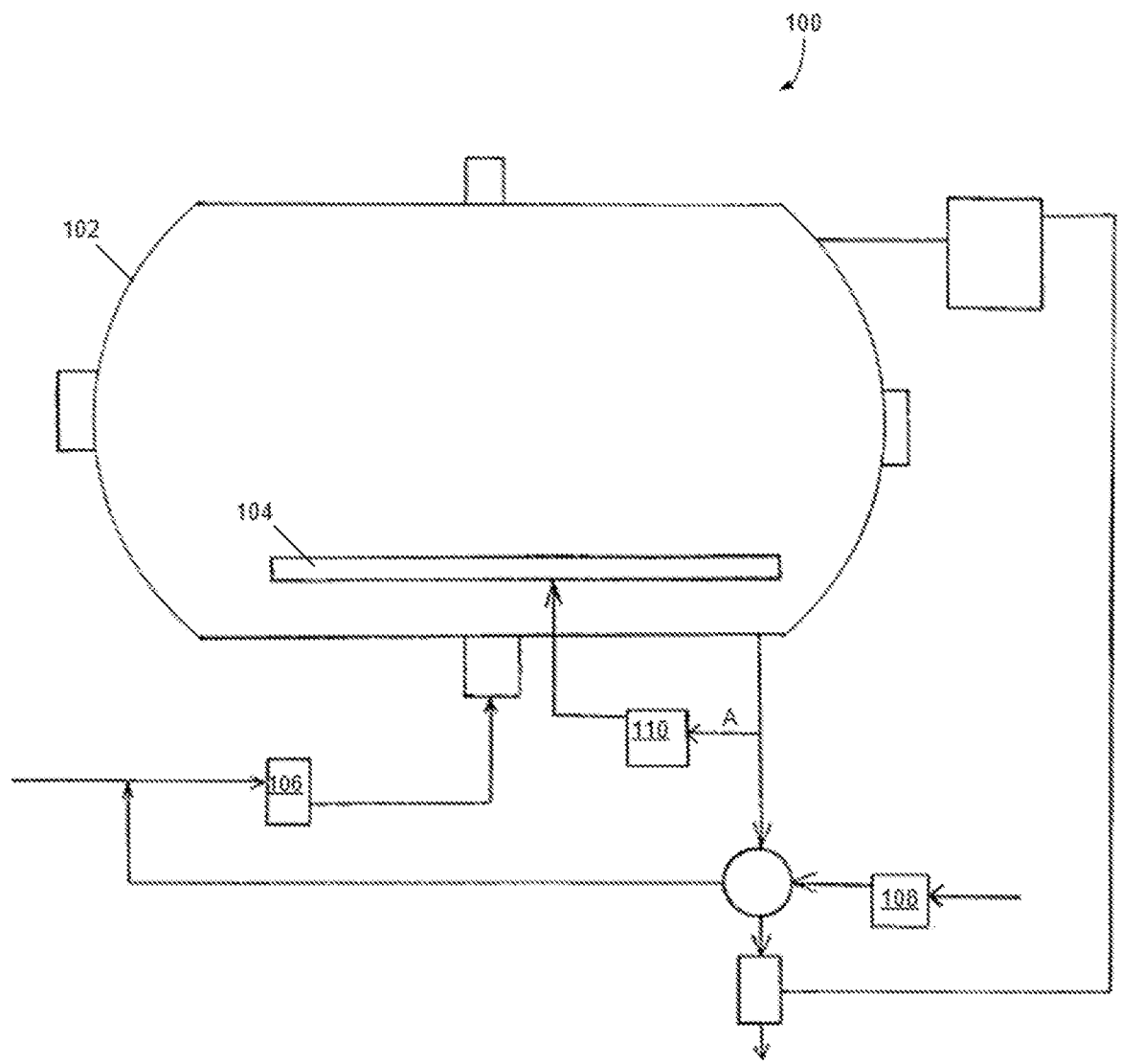
FIG. 1 is a diagram of a mud wash system of an illustrative embodiment of the disclosed technology.

As shown in FIG. 1, a mud wash system 100 of a desalter system is provided. The mud wash system 100 comprises a desalter vessel 102 having a mud wash header 104. Raw crude is provided to a mixing valve 106 prior to being directed into the desalter vessel 102. In some embodiments, the raw crude comprises oil sands crudes, heavy crudes, crude blends, and/or a combination thereof.

Wash water is directed into the mud wash header 104 by a wash water pump 108, which is located upstream to a mud wash pump 110. In some embodiments, the desalter system comprises a single stage desalter process, or a two-stage desalter process. In some embodiments, the mud wash system is a once through system, and in other embodiments, the mud wash system is a recirculating system.

The mud wash solvent of the present technology dissolves/solvates and/or dilutes the oil and grease components in the oily (i.e. problem) brine, thus lowering the density of these contaminants. By lowering the density, the bound/dissolved/solvated (i.e. lighter) blend of solvent and oil and grease components (being lighter than water in density), will raise faster (or separate) inside the desalter into the oil phase. Thus, the mud wash solvent produces a clearer brine water (i.e. improved quality of the brine) with significant reduction in oil and grease content, and a reduction in the emulsion layer inside the desalter vessel, and results in a lower treatment cost.

In some embodiments, the mud wash solvent is an organic solvent. The mud wash solvent of the present technology comprises a hydrocarbon having a specific gravity of less than that of the desalter brine to be treated. In some embodiments, the mud wash solvent comprises a hydrocarbon having a specific gravity of less than about 1.0. In other embodiments, the specific gravity of the hydrocarbon is less than about 0.8, and in other embodiments, less than about 0.7. In some embodiments, the hydrocarbon comprises (i) kerosene, (ii) naphtha, (iii) diesel, (iv) aromatic naphtha, (iv) heavy aromatic naphtha, and/or a combination thereof.

In some embodiments, the mud wash solvent further comprises an emulsion breaker composition. It should be understood that the presence of an emulsion breaker composition in the mud wash system as described herein can assist with improving effluent brine quality, the resolution of solids laden emulsions, and compliance with downstream regulations. The combination of an organic mud wash solvent with blends of different emulsion breaker compositions provide a synergistic effect in order to complex emulsion resolution of oily effluent brine during mud washing.

In some embodiments, less than about 50 ppm of the emulsion breaker composition is added to the mud wash solvent. In some embodiments, greater than about 50 ppm of the emulsion breaker composition is added to the mud wash solvent. In some embodiments, the emulsion breaker composition includes, but is not limited to, polyacrylamides (typically cationic), polyols, resin esters, sulfonates and/or succinates, tannins, polyamines, alkyl phenol resin ethoxylates, non-alkoxylated phenolic resin, hydroxy acids, amines or chemicals derived from polyisoalkyl succinimides and/or succinates.

The mud wash solvent of the present technology is added directly into the mud wash stream. With reference to FIG. 1, the mud wash solvent is added directly to the mud wash stream at location A, prior to entering the mud wash pump 110. It should be understood that the mud wash solvent can be added at any point in the desalter mud wash stream or mud wash recirculation stream.

In some embodiments, the mud wash solvent is added by connecting the solvent to the suction of the injection and/or recirculation system of the desalter bottom water and/or mud wash header. In other embodiments, the mud wash solvent is connected to the discharge of the recirculation feed pump to return to the mud wash header.

In some embodiments, the mud wash stream of the present technology comprises a high oil and grease (O&G) content of up to 10,000 ppm. In other embodiments, the mud wash stream comprises an oil and grease (O&G) content of 10,000 ppm or higher. In some embodiments, the mud wash stream of the present technology comprises a high oil and grease (O&G) content of about 1,000-10,000 ppm.

The oil and grease content as described herein is a measure of or the presence of oil and grease contaminants, such as, but not limited to, bitumen, fine solids and/or clays, oils, crude, and/or asphaltenes. By directly adding the disclosed mud wash solvent to the mud wash stream, a treated or improved effluent brine is provided, wherein the treated or improved effluent brine comprises a reduced oil and grease content. Improving (i.e. reducing) the oil and grease content of the effluent brine is advantageous in refineries where desalter residence time is low, and thus, producing low oil and grease brine is difficult.

In some embodiments, the oil and grease content of the effluent brine is reduced at least about 99%. In other embodiments, the oil and grease content is reduced at least 50%-99%.

In some embodiments, the mud wash solvent is added to the mud wash stream at about 0.1-100% solvent per gallons per minute (GPM) of mud wash stream. In other embodiments, the mud wash solvent is added to the mud wash stream at about 0.1-50% solvent per gallons per minute (GPM) of mud wash stream, in other embodiments, the mud wash solvent is added to the mud wash stream at about 0.1-10% solvent per gallons per minute (GPM) of mud wash stream, and in other embodiments, the mud wash solvent is added to the mud wash stream at about 0.5-5% solvent per gallons per minute (GPM) of mud wash stream.

In some embodiments, the mud wash solvent is directly injected into the mud wash stream. In other embodiments, the mud wash solvent is directly injected into the desalter vessel. In some embodiments, the mud wash solvent is injected into the mud wash stream at approximately 0.5-5% per gallons per minute (GPM) of mud wash recirculation flow. It should be understood that the mud wash solvent demand will increase if the oil and grease concentration in the desalter effluent brine increases.

In some embodiments, where the mud wash solvent comprises an emulsion breaker composition, the emulsion breaker composition is continuously or intermittently provided to the mud wash circuit. For example, the combination of the mud wash solvent with the emulsion breaker composition being dispersed into the mud wash header enhances sludge separation and resolution. The droplets of solvent solubilize organics into the rising solvent oil droplets to enhance removal of organics from the brine and accelerate their transport to the bulk hydrocarbon phase (i.e. a liquid-liquid solvent extraction process using the mud wash header to deliver the solvent solution). In some embodiments, the emulsion breaker composition comprises about 20% to about 100% active material in the mud wash solvent.

In other embodiments, the emulsion breaker composition is provided in an amount of less than about 50 ppm of water in desalter vessel. By providing emulsion breaker composition dilutions of less than 50 ppm (as compared to other ppm dosages in other typical applications, e.g. 50-20,000 ppm) to the mud wash solvent, it is possible to have a separate solvent injection system, or create non-typical chemical dilutions to eliminate excess chemistry in order to have sufficient solvent droplet population for absorption and transport of organics from the bottom of the desalter vessel.

In some embodiments, the treated effluent brine comprises an oil and grease content of less than about 1000 ppm. In other embodiments, the treated effluent brine comprises an oil and grease content of less than about 500 ppm. In other embodiments, the treated effluent brine comprises an oil and grease content of less than about 250 ppm, and in other embodiments, the treated effluent brine comprises an oil and grease content of less than about 125 ppm.

In a specific embodiment, a method of improving effluent brine quality is provided. The method comprises (i) providing a mud wash solvent, the mud wash solvent comprising a hydrocarbon having a specific gravity of less than about 1; and (ii) adding the mud wash solvent to a mud wash stream of a desalter system, wherein the mud wash stream comprises a desalter brine having an oil and grease content of at least 1,000 ppm, to provide a treated effluent brine having an oil and grease content of less than about 500 ppm.

EXAMPLES

The present invention will be further described in the following examples, which should be viewed as being illustrative and should not be construed to narrow the scope of the disclosed technology or limit the scope to any particular embodiments.

Figure 2:
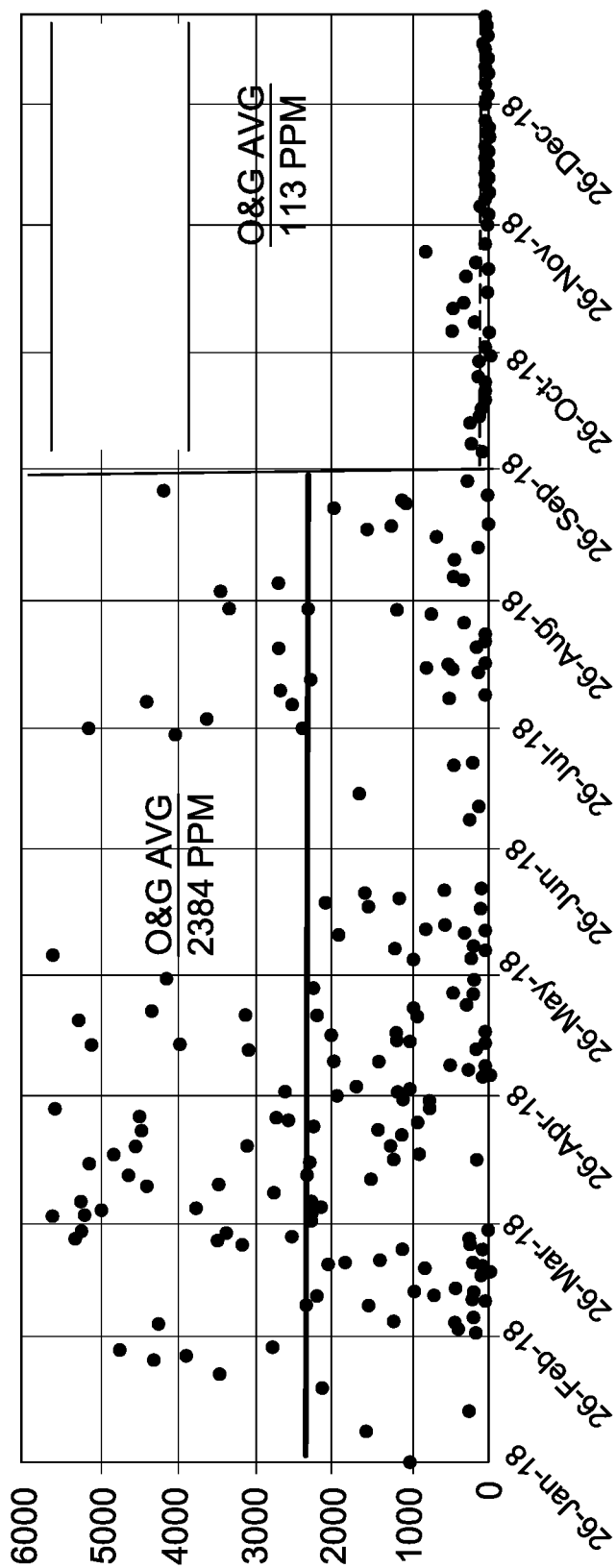
FIG. 2 provides results of an illustrative embodiment of the disclosed technology.

FIG. 2 provides the results of adding the mud wash solvent composition to a mud wash stream in accordance with the disclosed technology.

As compared to effluent brine in other conventional systems (see FIG. 2, January 2018-September 2018), by adding the mud wash solvent as disclosed herein, the oil and grease content is reduced to an average of less than 500 ppm (see FIG. 2, September 2018-December 2018).

In the foregoing specification, the invention has been described with reference to specific embodiments thereof. The mud wash solvents of this method would be expected to be useful in other hydrocarbon processing operations besides those explicitly mentioned. While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A method of improving effluent brine quality in a mud wash system comprising a desalter vessel for processing raw crude oil, wherein the desalter vessel comprises a mud wash header located at a bottom portion of the desalter vessel, the method comprising:
   (i) directing wash water into the mud wash header via a wash water pump located upstream of a mud wash pump directing mud wash water to the mud wash header, wherein the wash water is in turbulent contact with solids separated from the raw crude oil at the bottom portion of the desalter vessel and removes at least a portion of the solids from the desalter vessel thereby creating a mud wash stream to either route the solids to a wastewater system or to be recirculated back to the desalter vessel via the mud wash header, wherein the mud wash stream comprises water, oil, and grease; and
   (ii) adding a mud wash solvent directly into the mud wash stream prior to the mud wash stream entering the mud wash pump within the desalter system to provide a treated effluent brine, wherein the mud wash solvent comprises a hydrocarbon having a specific gravity less than that of the mud wash to be treated,
   wherein the mud wash solvent is added to the mud wash stream at about 0.1-100% solvent per gallons per minute of mud wash stream, and
   wherein the mud wash stream comprises an oil and grease content of (i) up to 10,000 ppm, (ii) 10,000 ppm or higher, or (iii) about 1,000-10,000 ppm.

2. The method as recited in claim 1, wherein the hydrocarbon comprises (i) kerosene, (ii) naphtha, (iii) diesel, (iv) aromatic naphtha, and/or (v) heavy aromatic naphtha.

3. The method as recited in claim 1, wherein the mud wash solvent is directly injected into the mud wash stream, and wherein the mud wash solvent is injected into the mud wash stream at approximately 0.1-10% per gallons per minute.

4. The method as recited in claim 1, wherein the desalter system comprises (i) a single stage desalter process, (ii) a two-stage desalter process, or (iii) more than a two-stage desalter process.

5. The method as recited in claim 1, wherein the treated effluent brine comprises an oil and grease content of (i) less than about 1000 ppm, (ii) less than about 500 ppm, or (iii) of less than about 125 ppm.

6. The method as recited in claim 1, wherein the mud wash solvent further comprises an emulsion breaker composition, wherein the emulsion breaker composition comprises polyacrylamides, polyols, resin esters, sulfonates, succinates, tannins, polyamines, alkyl phenol resin ethoxylates, non-alkoxylated phenolic resin, hydroxy acids, polyisoalkyl succinimide derivatives, succinate derivatives, or a combination thereof.

7. The method as recited in claim 6, wherein (i) less than about 50 ppm of the emulsion breaker composition is added to the mud wash solvent, or (ii) greater than about 50 ppm of the emulsion breaker composition is added to the mud wash solvent.

8. A method of improving effluent brine quality in a mud wash system comprising a desalter vessel for processing raw crude oil, wherein the desalter vessel comprises a mud wash header located at a bottom portion of the desalter vessel, the method comprising:
   (i) directing wash water into the mud wash header via a wash water pump located upstream of a mud wash pump directing mud wash water to the mud wash header, wherein the wash water is in turbulent contact with solids separated from the raw crude oil at the bottom portion of the desalter vessel and removes at least a portion of the solids from the desalter vessel thereby creating a mud wash stream to either route the solids to a wastewater system or to be recirculated back to the desalter vessel via the mud wash header, wherein the mud wash stream comprises water, oil, and grease;
   (ii) adding a mud wash solvent directly into the mud wash stream prior to the mud wash stream entering the mud wash pump within the desalter system to provide a treated effluent brine, wherein the mud wash solvent comprises a hydrocarbon having a specific gravity less than that of the mud wash to be treated, wherein the mud wash stream comprises a desalter brine having an oil and grease content of at least 1,000 ppm, to provide a treated effluent brine having an oil and grease content of less than about 500 ppm.

* * * * *